Aug. 25, 1925.

L. W. ERWAY 1,551,017

THRUST BEARING ADJUSTER

Filed Jan. 10, 1924

Inventor
L. W. Erway
By C. A. Snow & Co.
Attorneys

Patented Aug. 25, 1925.

1,551,017

UNITED STATES PATENT OFFICE.

LOUIS W. ERWAY, OF KALAMAZOO, MICHIGAN.

THRUST-BEARING ADJUSTER.

Application filed January 10, 1924. Serial No. 685,454.

*To all whom it may concern:*

Be it known that I, LOUIS W. ERWAY, a citizen of the United States, residing at Kalamazoo, in the county of Kalamazoo and State of Michigan, have invented a new and useful Thrust-Bearing Adjuster, of which the following is a specification.

This invention relates to a thrust bearing, one of its objects being to provide simple and efficient means for adjusting the bearing minutely, said adjusting means operating to hold the bearing positively in the position to which it has been moved so that there is no danger of the bearing working loose.

A further object is to provide adjusting means that can be reached readily and, while adapted to be used wherever adjustable bearings are desired, is more especially designed for differential and drive shaft bearings of automobiles.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1:
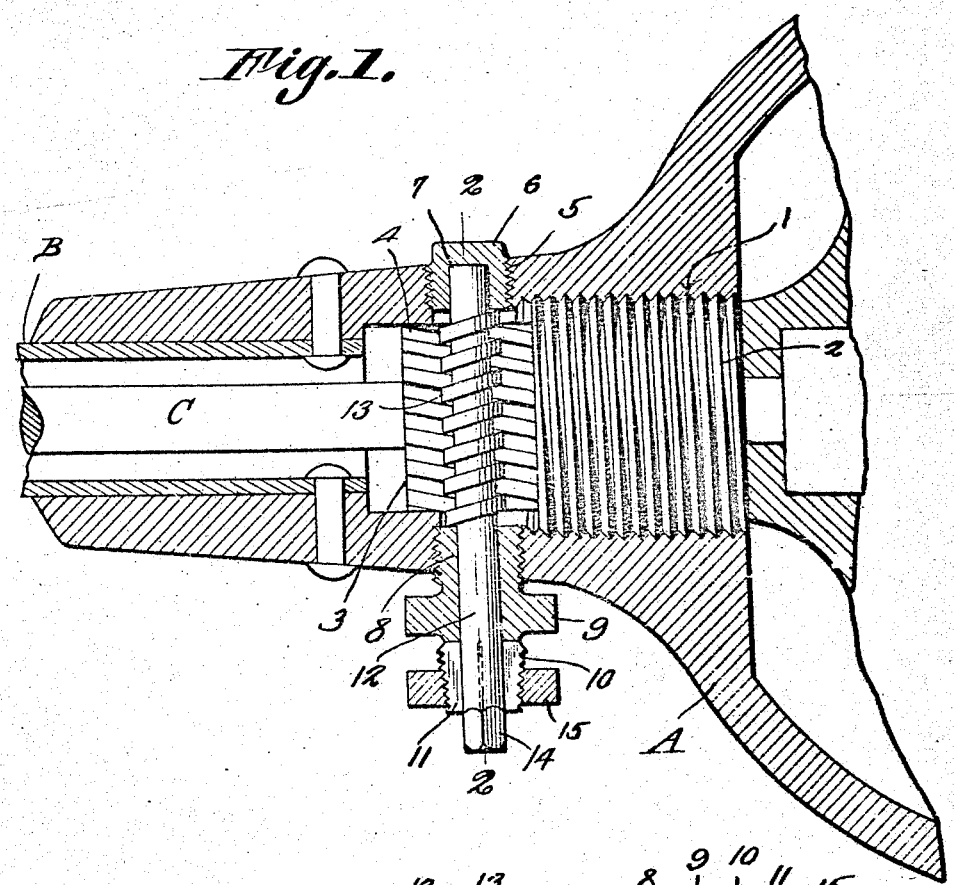
Figure 1 is a section through a portion of a differential housing provided with an adjustable bearing such as constitutes the present invention.
Figure 2:
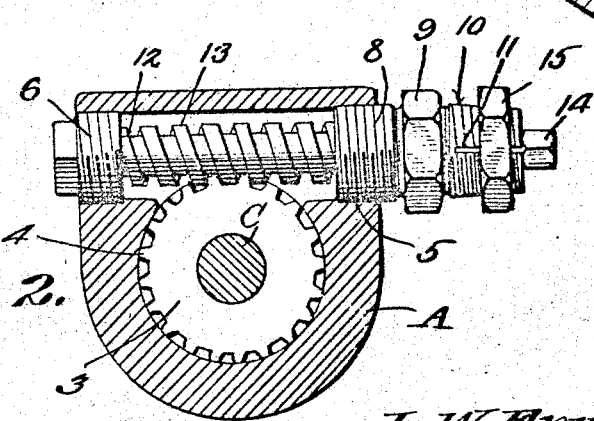
Fig. 2 is a section on line 2—2, Fig. 1, the adjusting mechanism being shown in elevation.

Referring to the figures by characters of reference A designates a portion of the differential housing to which is secured an axle casing B having an axle C therein. The differential housing has a screw threaded recess 1 in which is mounted an exteriorly screw threaded bearing 2 provided at one end with an extension 3. This extension has threads 4 thereon forming a worm gear. The bearing 2 can be provided with antifriction rollers or the like suitable for a thrust bearing but as the construction of the bearing does not constitute any part of the present invention, it has not been deemed necessary to describe or show the same in detail.

Formed in the housing A at diametrically opposed points are openings 5, the walls of which are screw threaded. One of these openings has a threaded plug 6 seated therein and formed with a recess 7. The other opening has a sleeve 8 screwed into it, said sleeve being provided between its ends with an angular head 9 whereby it can be engaged and rotated readily by means of a wrench or other suitable tool, for the purpose of screwing it into the housing. The outer end of the sleeve is preferably tapered and exteriorly screw threaded as shown at 10 and is formed with longitudinal slits 11. Journaled in the sleeve 8 is one end portion of a shaft 12 the other end of which is journaled in the recess 7. That portion of the shaft between the plug 6 and the sleeve 8 is provided with threads so as to constitute a worm 13 constantly meshing with the gear threads 4. The outer end of the shaft 12 is angular as shown at 14 so as to be engaged by a wrench or the like. A lock nut 15 is mounted on the tapered slit end of the sleeve.

When it is desired to adjust the bearing 2 longitudinally the nut 15 is loosened and shaft 12 is rotated by means of a suitable tool applied to the end thereof. Thus the worm 3 will rotate the gear and cause the threaded bearing 2 to revolve in the threaded opening and shift to the right or to the left as desired. Obviously a very minute adjustment can be effected and because of the construction of the adjusting mechanism it will not be possible for the bearing to shift accidentally from the position to which it has been adjusted. Furthermore the parts can be further held by tightening the nut 15 which will serve to compress the tapered slit end of the sleeve so as to bind it on the shaft 12.

What is claimed is:—

The combination with a housing, of a screw threaded bearing adjustably seated therein, a worm gear constituting an extension of the bearing and constantly seated in the housing, there being opposed openings in the housing, a bearing plug in one of the openings, a bearing sleeve in the other opening, a shaft journaled in the plug and sleeve, a worm upon the shaft constantly meshing with the worm gear, said worm being located at all times within the housing, and means for contracting the sleeve upon the shaft to hold the shaft against rotation.

In testimony that I claim the foregoing as my own, I have hereto affixed my signature.

LOUIS W. ERWAY.